(12) United States Patent
Ando et al.

(10) Patent No.: US 8,537,521 B2
(45) Date of Patent: Sep. 17, 2013

(54) ELECTRONIC DEVICE AND METHOD FOR PRODUCING ELECTRONIC DEVICE

(75) Inventors: Norihisa Ando, Tokyo (JP); Yoshitomo Matsushita, Tokyo (JP)

(73) Assignee: TDK Corporation, Tokyo (JP)

( * ) Notice: Subject to any disclaimer, the term of this patent is extended or adjusted under 35 U.S.C. 154(b) by 305 days.

(21) Appl. No.: 13/073,216

(22) Filed: Mar. 28, 2011

(65) Prior Publication Data

US 2011/0235233 A1    Sep. 29, 2011

(30) Foreign Application Priority Data

Mar. 29, 2010    (JP) ................. 2010-075939

(51) Int. Cl.
*H01G 4/30*    (2006.01)
*H01G 4/06*    (2006.01)
*H01G 7/00*    (2006.01)

(52) U.S. Cl.
USPC ............ 361/301.4; 361/321.1; 361/321.2; 29/25.41

(58) Field of Classification Search
USPC ............ 361/321.1, 321.2, 301.4; 29/25.41
See application file for complete search history.

(56) References Cited

U.S. PATENT DOCUMENTS

| | | | |
|---|---|---|---|
| 2004/0216305 A1 | 11/2004 | Kobayashi et al. | |
| 2007/0074806 A1 | 4/2007 | Kojima et al. | |
| 2007/0211406 A1 | 9/2007 | Hara et al. | |

FOREIGN PATENT DOCUMENTS

| | | |
|---|---|---|
| JP | A 2001-110664 | 4/2001 |
| JP | A 2003-124049 | 4/2003 |
| JP | A 2003-264120 | 9/2003 |
| JP | A 2003-272947 | 9/2003 |
| JP | A-2007-103453 | 4/2007 |
| JP | A-2007-123198 | 5/2007 |
| JP | A-2007-243026 | 9/2007 |
| JP | A-2008-277765 | 11/2008 |

*Primary Examiner* — Eric Thomas
*Assistant Examiner* — Arun Ramaswamy
(74) *Attorney, Agent, or Firm* — Oliff & Berridge, PLC (57) ABSTRACT

An electronic device includes a plurality of internal electrode layers and dielectric layers alternately laminated. The particle size of the first dielectric particles contacting one laminating direction end face of the internal electrode layer is larger than the particle size of second dielectric particles contacting another laminating direction end face of the internal electrode layer. A thickness of a first ceramic layer formed by the first dielectric particles is smaller than a thickness of a second ceramic layer formed by the second dielectric particles.

9 Claims, 8 Drawing Sheets

ELECTRONIC DEVICE AND METHOD FOR PRODUCING ELECTRONIC DEVICE

BACKGROUND OF THE INVENTION

1. Field of the Invention

The present invention relates to electronic device such as multilayer ceramic capacitor and the like, and method for electronic device.

2. Description of the Related Art

As for one example of electronic device implemented to an electronic apparatus, a multilayer type ceramic electronic device is exemplified, a capacitor, a bandpass filter, an inductor, a piezo element, a PTC thermistor, a NTC thermistor or a varistor and the like have been known.

A capacitor element body of these multilayer type ceramic electronic device is produced, for example, by preparing an angular parallelepiped shape green chip composed by laminating a green chip which becomes a dielectric layer after firing and an internal electrode pattern layer which becomes an internal electrode layer after firing, and co-firing thereof.

Here, as for laminating method for the green sheet and the internal electrode layer patter, for example, there is a method that a green sheet is applied to a base material such as PET film and the like, a sheet unit is formed thereof so that said sheet is sequentially laminated.

However, in this case, although the dielectric layer and the internal electrode layer to form one sheet unit have comparatively sufficient binding strength, binding strength of the internal electrode layer and a dielectric layer of another sheet unit formed on said sheet unit tended to be insufficient. In case that the binding strength of the dielectric layer and the internal electrode layer is insufficient like this, mechanical strength tends to deteriorate.

Thus from the actual circumstances, it has been required an art to improve the binding strength of the internal electrode layer and the green sheet of the other sheet formed on said sheet unit. For example, in a gazette of Japanese Patent laid Open No. 2003-264120, a method that an internal electrode layer is formed on a first ceramic layer which includes a ceramic having an average particle diameter α1, a second ceramic layer which includes a ceramic having an average particle size α2 which is smaller than said average particle size α1, is formed thereon, and combination thereof are laminated sequentially is disclosed.

By this method, although it is considered that the binding strength of the internal electrode layer and the ceramic layer can be obtained, the binding strength of the first ceramic layer and the second ceramic layer is insufficient, because it is only heat pressure binding by pressing.

Therefore, as an element body, it becomes insufficient mechanical strength. Also, highly accelerated life time is reduced, because a thickness of the first ceramic layer which includes smaller particle diameter is thinner than a thickness of the second ceramic layer.

SUMMARY OF THE INVENTION

The present invention has been made by considering this real scene and its purpose is to provide electronic device having high mechanical strength and a method for producing electronic device without reducing highly accelerated life time.

In order to achieve the above purpose, an electronic device according to the present invention comprised of a plurality of internal electrode layers and dielectric layers alternately laminated wherein particle size of first dielectric particles which contact at one laminating direction end face of said internal electrode layer is larger than particle size of second dielectric particles which contact at another laminating direction end face of said internal electrode layers; and a thickness of a first ceramic layer formed by said first dielectric particles is smaller than a thickness of a second ceramic layer formed by said second dielectric particles.

Also, a method for producing an electronic device of the present invention comprises steps of;

preparing a paste for internal electrode layer including first ceramic particles and a conductive particles, preparing a paste for dielectric layer including a second ceramic particles, obtaining a green sheet by coating said paste for dielectric layer to a support body, obtaining a sheet unit in which an internal electrode pattern layer is formed by said paste for internal electrode layer on said green sheet, and obtaining a green chip by laminating said sheet unit, wherein a density of said first ceramic particles existing near a face of said internal electrode pattern layer formed on said sheet unit, which does not contact to said green sheet, is larger than a density of said first ceramic particles existing near a face of said internal electrode pattern layer, which contacts to said green sheet.

According to the present invention, the binding strength of the dielectric layer and the internal electrode layer can be improved without reducing highly accelerated life time, and electronic device having high mechanical strength and a method for producing electronic device can be provided.

Preferably, when the thickness of said first ceramic layer is defined as t1, the thickness of said second ceramic layer is defined as t2, $0.160 \leq t1/(t1+t2) \leq 0.275$.

Preferably, when the particle size of said first dielectric particles is r1, the particle size of said second dielectric particles is r2, $r1/r2 \leq 2.17$.

Preferably, said first ceramic layer is formed by said first dielectric particles arranged in a plane parallel to a laminating plane, so that said single first dielectric particle exists in a laminating direction per one first ceramic layer.

The method for producing electronic device according to the present invention preferably comprises, drying said sheet unit at 80° C. or below.

Preferably, when a content of said conductive particles included in said internal electrode pattern layer is 100 parts by weight, a content of said first ceramic particles included in the internal electrode pattern layer is 10 to 20 parts by weight.

As for the electronic device according to the present invention, although it is not particularly limited, a multilayer ceramic capacitor, a piezo element, a chip inductor, a chip varistor, a chip thermistor, a chip resistor, other surface mounted device (SMD), a chip type electronic device and the like are exemplified, preferably, the multilayer type ceramic capacitor.

BRIEF DESCRIPTION OF THE DRAWINGS

FIG. 3b is a process schematic view showing continuous process of FIG. 3a.

DESCRIPTION OF THE PREFERRED EMBODIMENTS

Below, the present invention will be explained based on embodiments shown in drawings.

In the present embodiment, as one example of electronic device, it will be explained with respect to a multilayer type ceramic capacitor.

Entire Configuration of Multilayer Ceramic Capacitor

Figure 1:
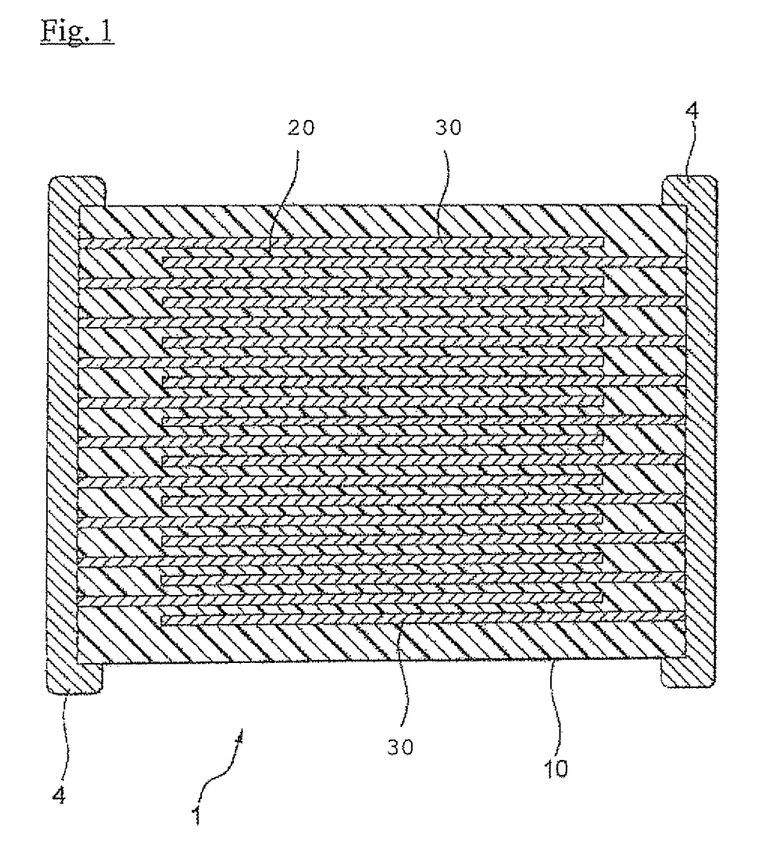
FIG. 1 is a cross sectional view of a multilayer ceramic capacitor according to one embodiment of the present invention.

As shown in FIG. 1, a multilayer ceramic capacitor 1 according to one embodiment of the present invention comprises an element body 10. Said element body 10 has a structure wherein dielectric layers 20 and internal electrode layers 30 are alternately laminated. Although there is no limitation for a shape of the element body 10, in normally, it is a rectangular parallelepiped shape. Also, there is no limitation for its dimension, it can be an appropriate dimension in response to a purpose of use. As shown in FIG. 1, a pair of external electrode 4, which respectively conducts to internal electrodes 30 alternately arranged in the element body 10 is formed at both side end portions of said element body 10.

(Internal Electrode Layer)

Although a thickness of the internal electrode layer 30 can be appropriately decided in response to a purpose of use and the like, in normally, 0.5 to 5 μm, particularly 0.5 to 2.5 μm and the like is preferred.

Although a conductive material 230 included in the internal electrode layer is not particularly limited, when it is used as a constitutional material for the dielectric layer, a base metal can be used. As for the base metal used for the conductive material, Ni, Cu, Ni alloys or Cu alloy are preferable. When the Ni is used as a main component of the internal electrode layers 30, a method for firing under low oxygen partial pressure (reducing atmosphere) is adopted, in order not to reduce the dielectric body.

A particle size of the dielectric material is preferably 0.05 to 2.00 μm, more preferably 0.05 to 1.00 μm.

(External Electrode)

Although a thickness of the external electrode 4 can be decided in response to a purpose of use and the like, in normally, 10 to 50 μm and the like is preferable.

The external electrode is composed by conductive powder. As for the conductive powder, for example, although base metal is exemplified, it is not limited particularly, inexpensive Ni, Cu and their alloys can be used.

(Dielectric Layer)

Figure 2:
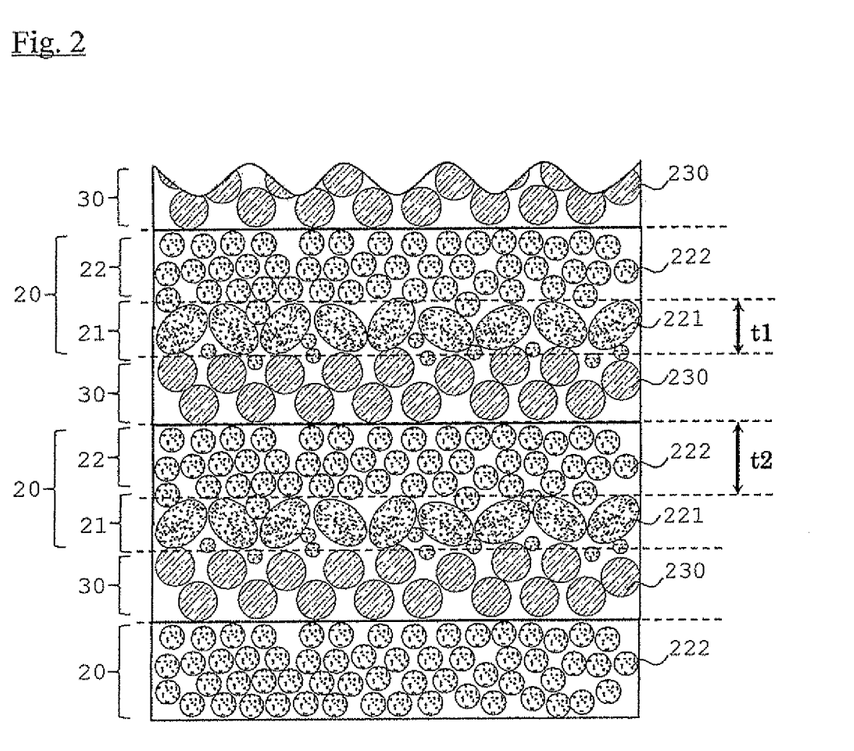
FIG. 2 is a cross sectional view of a multilayer body according to one embodiment of the present invention.

Said dielectric layer 20 comprises, as shown in FIG. 2, a first ceramic layer 21 formed by first dielectric particles 221 and a second ceramic layer 22 formed by second dielectric particles 222, a thickness of said first ceramic layer 21 is smaller than a thickness of said second ceramic layer 22.

Also, as shown in FIG. 2, particle size of first dielectric particles 221 which contact at one laminating direction end face of said internal electrode layer 30 is larger than a particle size of second dielectric particles 222 which contact at another laminating direction end face of said internal electrode layers 30.

When a thickness of said first ceramic layer 21 is defined as t1, a thickness of said second ceramic layer 22 is defined as t2, it is preferable that $0.160 \leq t1/(t1+t2) \leq 0.275$. By setting the $t1/(t1+t2)$ is within this range, mechanical strength of the electronic device can be improved without reducing highly accelerated life time.

Preferably, said first ceramic layer 21 is formed by said first dielectric particles arranged in a plane parallel to a laminating plane, so that said single first dielectric particle exists in a laminating direction per one first ceramic layer. Here, "said single first dielectric particle exists in a laminating direction per one first ceramic layer" means that particles other than the first dielectric layer 221 are not excluded, for example, as shown in FIG. 2, dielectric particles which are smaller than the first dielectric particle 221 may be included.

Also, when the particle size of said first dielectric particles is r1, the particle size of said second dielectric particles is r2, it is preferable that $r1/r2 \leq 2.17$. By setting the r1/r2 within this rage, mechanical strength of the electronic device can be improved without reducing highly accelerated life time.

A thickness of said dielectric layer 20 is preferably 2 to 4 μm, more preferably 2 to 30 μm and a number of laminating is 2 to 300 and the like.

As for the composition of said first dielectric particle 221 and the second dielectric particle 222, for example, following compositions are exemplified.

As main components of said first dielectric particle and the second dielectric particle, for example, dielectric oxides shown by a compositional formula $(Ba_{1-x}Ca_x)_m(Ti_{1-y}Zr_y)O_3$ is exemplified. At this time, amount of oxygen (O) may slightly be polarized from stoichiometry of the above formula.

In the above formula, the x is preferably $0 \leq x \leq 0.15$. The x shows number of atoms of Ca, a phase transition point of crystal can be shifted arbitrary by changing a symbol x, namely Ca/Ba ratio. Therefore, a temperature coefficient of capacitance and a specific permittivity can be controlled arbitrary.

In the above mentioned formula, the y is preferably $0 \leq y \leq 1.00$. The y shows number of Ti atoms, and reducing resistance tends to be increased further by substituting $ZrO_2$ which is hard to be reduced compared with $TiO_2$.

In the above mentioned formula, the m is preferably $0.995 \leq m \leq 1.020$. By setting the m 0.995 or more, it is prevented as being a semi-conductor against firing under reducing atmosphere, and a consolidated firing body can be obtained by setting the m 1.020 or below, even though a firing temperature is not set as higher.

As for sub-components of said first dielectric particle and second dielectric particle, for example, following mentioned first to fourth sub-components may be included. Namely, the first sub-component including at least one kind selected from MgO, CaO, GaO and SrO, the second sub-component including $SiO_2$ type of a sintering aids, the third sub-component including at least one kind selected from $V_2O_5$, $MoO_3$, and $WO_3$, the fourth sub-component including oxide of R (note, R is at least one selected from Sc, Y, La, Ce, Pr, Nd, Pm, Sm, Eu, Gd, Tb, Dy, Ho, Er, Tm, Yb and Lu) are comprised.

A ratio of the above mentioned respective sub-components are; preferably, first sub-components: 0.1 to 5 mol
second sub-components: 1 to 10 mol
third sub-components: 0.01 to 0.2 mol
fourth sub-components: 0.1 to 12 mol to 100 mol of the above mentioned main components.

Note that, the above mentioned ratio of the fourth sub-component is not mol ratio of the oxide of R, it is a mol ratio of single R element. Namely, for example, when the oxide of Y is used as for the fourth sub-component (oxide of R), a ratio of the fourth sub-component is 1 mol means a ratio of Y element is 1 mol and a ratio of $Y_2O_3$ is not 1 mol.

By adding these first to fourth sub-components to the main component comprising the above mentioned predetermined composition, it is possible to improve a temperature coefficient of capacitance with maintaining high dielectric constant, in particular X8R characteristics of EIA standard can be satisfied. Preferable a content of the first to fourth sub-components are as mentioned above. Also, the meaning thereof is as follows.

The first sub-component (MgO, CaO, BaO and SrO) has an effect to flattening the temperature coefficient of capacitance. Note that constitutional ratio of the respective oxides in the first sub-component is arbitral.

The second sub-component performs as sintering aids. When a content of the second sub-component is too small, the temperature coefficient of capacitance tends to be deteriorated. On the other hand, when the content is too large, IR lifetime tends to be insufficient. Also, although the second sub-component may be used by single $SiO_2$, $(Ba, Ca)_xSiO_{2+x}$ (note that x=0.8 to 1.2) is preferable. The x in $(Ba, Ca)_xSiO_{2+x}$ is preferably 0.8 to 1.2, more preferably 0.9 to 1.1. When the x is too small, namely when $SiO_2$ is too large, the dielectric characteristic is caused as deteriorated due to reacting with barium titanate included in the main component. On the other hand, when the x is too large, it is not preferable because sintering property is deteriorated due to a melting point becomes higher. Note that, a proportional ratio of Ba and Ca in the second sub-component is arbitral, and it may be included only one.

The third sub-component ($V_2O_5$, $MoO_3$ and $WO_3$) has an effect for flattening a temperature coefficient of capacitance at Curie temperature and above, and an effect to improve IR life time. Note that, a constitutional ratio of respective oxides is arbitral.

The fourth sub-component (oxide of "R") has an effect to shift the Curie temperature to a lower temperature side and an effect for flattening a temperature coefficient of capacitance.

The composition of said first dielectric particle 221 and second dielectric particle 222 are not particularly limited, the composition of first dielectric particle and second dielectric particle may be an identical or may be slightly different, however, identical is preferable.

Method for Producing Multilayer Ceramic Capacitor

A multilayer ceramic capacitor according to the embodiment of present invention is produced by, as similar to a conventional multilayer capacitor, making a green chip by using an ordinal printing method or sheet method with using paste, after firing thereof, printing or transferring an external electrode and firing. Below, a producing method will be specified concretely.

(Paste for Internal Electrode Layer)

A paste for internal electrode layer according to the embodiment of the present invention comprises a first ceramic particle and conductive particle, and is prepared by converting paint due to kneading the first ceramic particle and the conductive particle with an organic vehicle or water type vehicle.

As for the first ceramic particle included in the paste for internal electrode layer, although it is not particularly limited, a particle size is preferably 0.05 μm to 2.00 μm, more preferably 0.05 μm to 1.00 μm.

As for said conductive particle, although it is not particularly limited, various conductive metals, alloys, various oxides, organic metallic compound, resinate and the like which become the above mentioned conductive material after firing are exemplified. For example, when using a particle having Ni as a main component is used, preferably a particle having Ni content is 90 wt % or more, more preferably Ni content is 95 wt % or more is used Note that, a particle size of the conductive particle is preferably 0.1 μm to 0.7 μm, more preferably 0.1 μm to 0.3 μm.

The organic vehicle means that resin is dissolved in organic solvents. The resin used for the organic vehicle is not particularly limited, it may be suitably selected from various normal resins such as ethyl cellulose, polyvinyl butyral and the like. Also, the used organic solvents are not particularly limited, it may be suitably selected from various normal organic solvents such as terpineol, butyl carbitol, acetone, toluene and the like, in response to utilized method such as printing method, sheet method and the like.

Also, a water soluble resin used for the water type vehicle is not particularly limited too, for example, polyvinyl alcohol, cellulose, water soluble acrylic resin and the like may be used.

(Paste for Dielectric Layer)

A paste for dielectric layer according to the embodiment of the present invention comprises the second ceramic particle, and is prepared by converting paint due to kneading the second ceramic particle and the conductive particle with the organic vehicle or water type vehicle.

A particle size of said second ceramic particle is preferably 0.15 μm to 0.5 μm, more preferably 0.2 μm to 0.3 μm. Although composition of said second ceramic particle is not particularly limited, for example, a composition which becomes the above mentioned first dielectric particle or second dielectric particle after firing are exemplified.

Also, although the second ceramic particle is obtained by mixing oxide of the main component or sub-component of the above mentioned first dielectric particle or second dielectric particle, mixture thereof or complex oxide, it can be obtained by mixing other various compounds which become the above mentioned oxide or complex oxide by firing that are suitably selected from, for example, oxalate, nitrate, hydroxide, organic metal compound and the like too.

Note that, as similar with the method for obtaining the above mentioned second ceramic particle, the first ceramic particle can be obtained too. The composition of the first ceramic particle is not particularly limited, it may be identical composition with the second ceramic particle or may be different. For example, the first ceramic particle may include only one of the main component or sub-component of the above mentioned first dielectric particle or second dielectric particle.

(Paste for External Electrode)

A paste for external electrode may be prepared as similar with the above mentioned the paste for internal electrode by kneading the above mentioned conductive powder and organic vehicle.

(Green Chip)

A green chip according to the embodiment of the present invention is obtained by laminating a plurality of sheet units which comprises a green sheet and an internal electrode pattern layer.

Figure 3A:
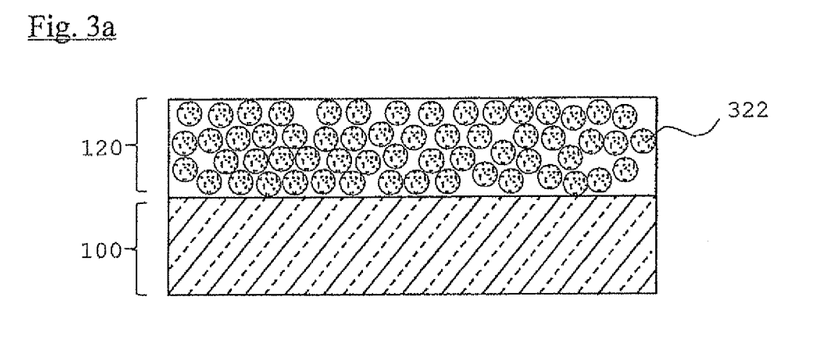
FIG. 3a is a process schematic view showing a producing process of the multilayer ceramic capacitor shown in FIG. 1.

Firstly, a green sheet 120 is formed by coating a paste for dielectric layer with the doctor blade method and the like on a surface of a base material 100 which is composed of, for example, PET film and the like (FIG. 3a). Next, the paste for internal electrode layer is applied as predetermined patter on a surface of the green sheet 120 which is formed on the base material 100 to form an internal electrode pattern layer 130 so that a sheet unit 140 is obtained (FIG. 3b).

Said green sheet 120 becomes a dielectric layer 20 shown in FIG. 1 after firing, the internal electrode layer patter 130 becomes an internal electrode layer 30 shown in FIG. 1 after firing.

Figure 3B:
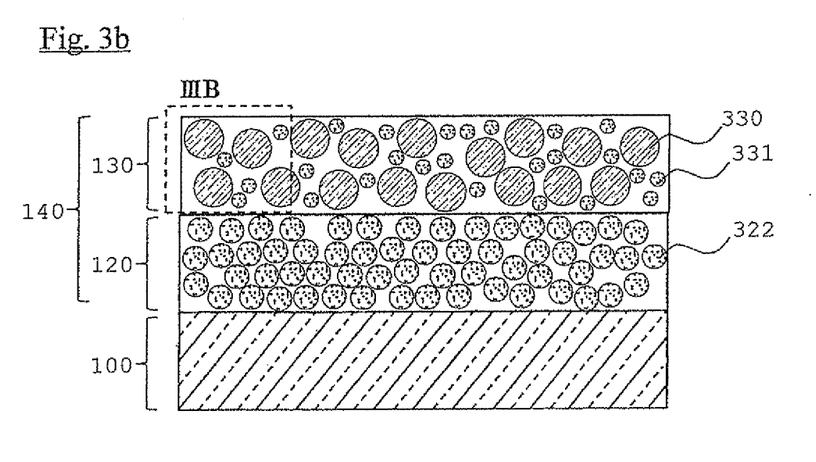

A method for forming the internal electrode pattern layer 130 shown in FIG. 3b is not particularly limited, unless if it is a method to form a layer uniformly, for example, a screen printing method using the paste for internal electrode layer or a method for forming thick film such as a gravure method and the like or thin film forming method such as vapor deposition, sputtering and the like may be exemplified.

In the present embodiment, a margin pattern layer which is substantially similar thickness with the internal electrode pattern layer 130 may be formed on a surface clearance (margin pattern part) of the green sheet on which the internal electrode pattern layer 130 is not formed, before or after forming the internal electrode pattern layer 130 on the surface of the green sheet 120. Forming the margin pattern layer is in order for not generating a gap between the internal electrode pattern layers 130 on the green sheet 120.

Figure 3C:
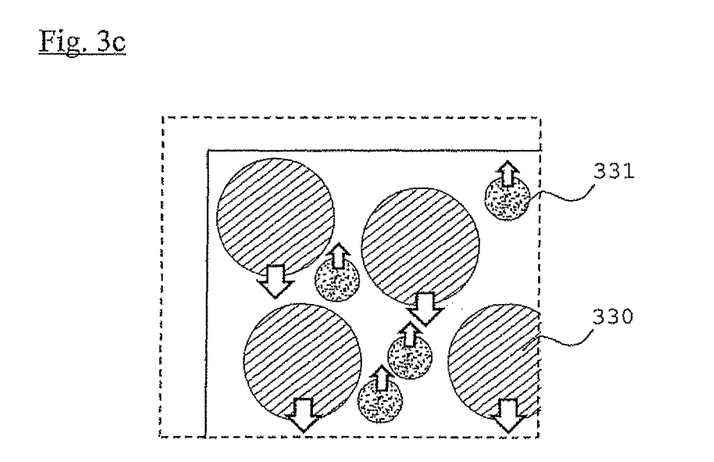
FIG. 3c is an enlarged cross sectional view showing a part IIIB of the internal electrode pattern layer shown in FIG. 3b.
Figure 3D:
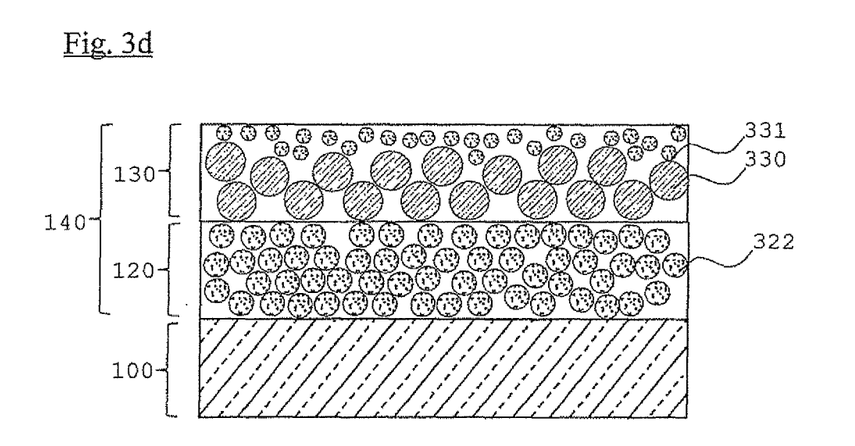
FIG. 3d is a process schematic view showing continuous process of FIG. 3b.

Next, as shown in FIG. 3d, a density of said first ceramic particles 331 existing near a face of internal electrode pattern layer 130 formed on said sheet unit 140, which does not contact to the green sheet 120, is larger than a density of said first ceramic particles 331 existing near a face of the internal electrode pattern layer 130, which contacts to said green sheet 120. Although a method for largely distributing said first ceramic particle 331 unevenly is not particularly limited, for example, there is a method for drying said sheet unit 140 under a predetermined condition.

Firstly, as for the method for drying under a predetermined condition, it is preferable the sheet unit 140, wherein the internal electrode pattern layer 130 is laminated on said green sheet 120, is dried under a condition that an atmospheric temperature is 80° or below. By setting the atmospheric temperature of drying process within this range, a conductive particle 330 and the first ceramic particle 331 are separated by a difference of a relative density. Namely, as shown in FIG. 3c, the conductive particle 330 having high relative density descends. Thereby, the first ceramic particle 331 having low relative density exists above the conductive particle 330, it is available to make a condition of distributing the first ceramic particle 331 unevenly as shown in FIG. 3d.

On the other hand, in the drying process, when it is set higher than the above mentioned atmospheric temperature, unevenly distribution of the first ceramic particle 331 tends to be difficult. This is considered, because the conductive particle 330 and the first ceramic particle 331 are dispersed by occurring convective flow in the internal electrode pattern layer 130, as shown in FIG. 3g.

Also, the atmospheric temperature in the above mentioned drying process is more preferably 60° C. or higher and 80° or below.

Also, in a method for drying under the above mentioned predetermined condition and a method for utilizing a centrifugal force, before laminating the internal electrode pattern layer on the green sheet, applying the above mentioned method to the internal electrode layer only so that the first ceramic particle 331 is caused to be distributed unevenly, then the internal electrode pattern layer in which the first ceramic particle 331 is unevenly distributed may be laminated on the green sheet. By making this, invasion of the conductive particle included in the internal electrode pattern layer into the green sheet excessively can be prevented, When a particle size of the first ceramic particle is defined as $r_{C1}$ and a particle size of the conductive particle is defined as $r_M$, preferably the $r_{C1}$ is smaller than the $r_M$, more preferably $0.15 \leq r_{C1}/r_M \leq 0.7$, furthermore preferably $0.25 \leq r_{C1}/r_M \leq 0.5$.

Because the particle size of the first ceramic particle is smaller than the size of the conductive particle, the first ceramic particle can be entrapped into a space occurred between the conductive particles. For this cause, separation efficiency becomes higher when performing separation by the difference of relative density such as the above mentioned methods for drying under a predetermined condition or utilizing centrifugal force.

A multilayer body 150 is obtained by laminating a plurality of the sheet units 140 which is obtained by the above process (FIG. 3e, FIG. 3f), the multilayer body 150 is cutout as lattice, and a plurality of green chips are formed.

(Firing Green Chip)

After barrel polishing and the like performed to a green chip, then it is cleaned by water, and it is dried and fired. Note that, binder removal process is applied to the green chip before firing. Although the binder removal process is suitably selected in response to kinds of conductive material in the paste for internal electrode layer, when the base metal such as Ni and Ni alloy and the like are used as conductive material, an oxygen partial pressure is $10^{-45}$ to $10^5$ Pa is preferable. When the oxygen partial pressure is within said range, the binder removal effect is improved and oxidization of the internal electrode layer tends to be reduced.

Also, as for other binder removal condition except for the above, a temperature rising speed is preferably 5 to 300° C./hr, a temperature holding time is preferably 0 to 24 hrs. Also, a firing atmosphere is preferably air or reducing atmosphere, as for an atmosphere gas, for example, it is preferable to use a wet mixing gas of $N_2$ and $H_2$.

Also, a holding temperature at firing is preferably 1100 to 1400° C. By the holding temperature included in said range, it is available to prevent cutting of electrode caused by abnormal sintering of the internal electrode.

When it is fired in the reducing atmosphere, it is preferable to apply an annealing to a capacitor element body. The annealing is a treatment for reoxidation of the dielectric layer, thereby dependability is improved because IR life time can be increased extremely.

The binder removal process, firing and annealing may be performed continuously or individually.

An end face polishing is performed to the element body obtained as mentioned above by barrel polishing, sand blast and the like, the paste for internal electrode layer is printed or transferred and firing to form an external electrode 4. A firing condition of the paste for external electrode is preferably, for example, in a wet mixing gas of $N_2$ and $H_2$, at 600 to 800° C. and during 10 min to 1 hr and the like. Then, a coating layer is formed by plating and the like on a surface of the external electrode 4 in response to necessity.

The multilayer ceramic capacitor according to the embodiment of the present invention produced as above is mounted on a printed circuit board by soldering and the like and is used for various electronic device and the like.

In the present embodiment, by the dielectric layer 20 and the internal electrode layer 30 are composed like these, as shown in FIG. 2, the first dielectric particle 221 having large particle diameter acts as an anchor between the dielectric layer 20 and the internal electrode layer 30 so that binding strength of the dielectric layer 20 and the internal electrode 30 can be improved.

Also, according to existing the second ceramic layer 22 composed of the second dielectric particle 222 whose particle size is smaller than the size of the first dielectric particle 221, it is possible to improve the highly accelerated life time of the electronic device.

In a method for producing the multilayer ceramic capacitor according to the embodiment of the present invention, as shown in FIG. 3d, the density of said first ceramic particles 331 existing near a plane of said internal electrode pattern layer 130 formed on said sheet unit 140, which does not contact to said green sheet 120, is larger than the density of said first ceramic particles 331 existing near a plane of said internal electrode pattern layer 130, which contacts to said green sheet 120.

Figure 3E:
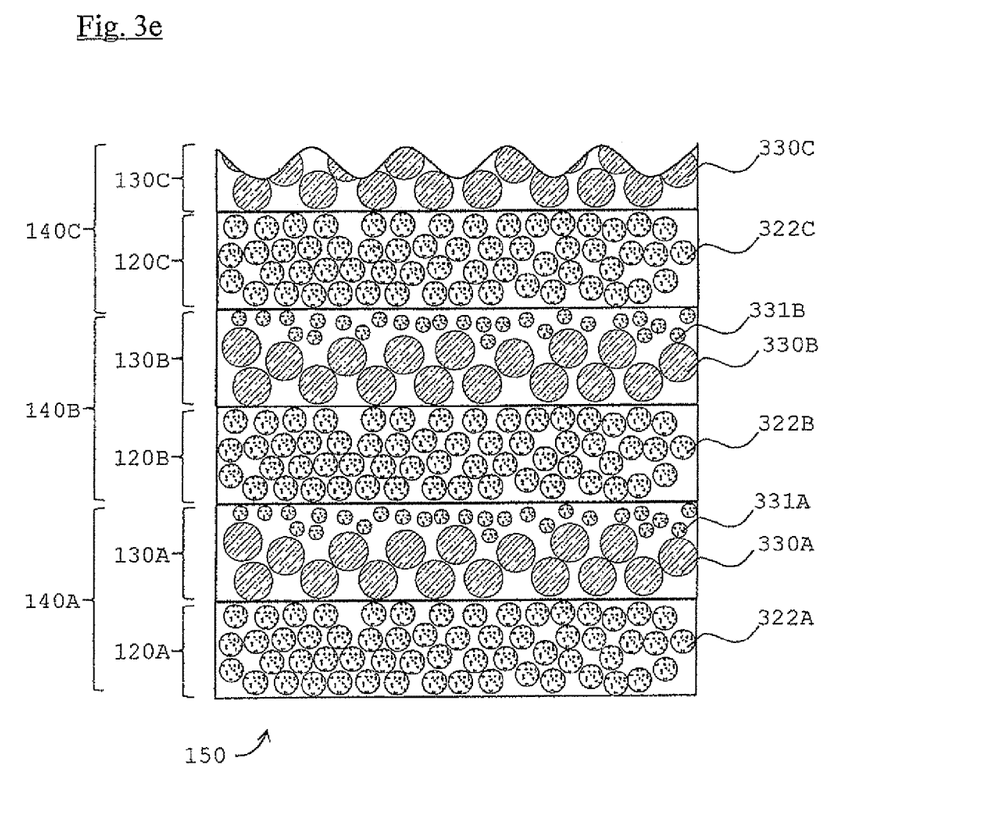
FIG. 3e is a process schematic view showing continuous process of FIG. 3d.
Figure 3F:
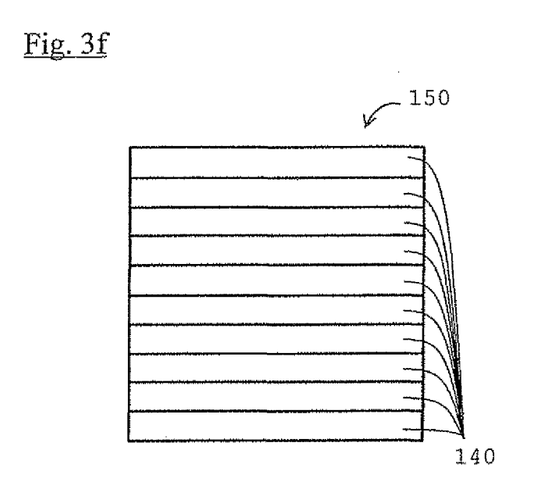
FIG. 3f is a process schematic view showing continuous process of FIG. 3e.
Figure 3G:
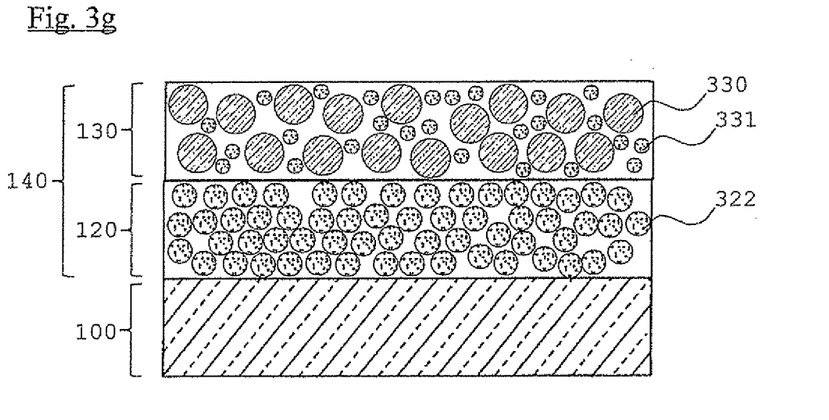
FIG. 3g is a cross sectional view of a sheet unit according to one embodiment of the present invention.

By the sheet unit 140 composed like these, as shown in FIG. 3e, when laminating a plurality of sheet unit, for example, a first ceramic particle 331A included in an internal electrode pattern layer 130A contacts to a second ceramic particle 3223 included in a green sheet 120B of a sheet unit 140B. According to this, when firing the green chip, the second ceramic particle 322B is grain grown by the existence of the first ceramic particle 331A so that it becomes the first dielectric layer 221 shown in FIG. 2.

Also, when a particle size of the second ceramic particle is defined as $r_{c2}$, preferably a particle size $r_{c1}$ of the first ceramic particle is smaller than the $r_{c2}$, more preferably, $0.15 \leq r_{c1}/r_{c2} \leq 0.75$, furthermore preferably, $0.3 \leq r_{c1}/r_{c2} \leq 0.5$.

By the particle size $r_{c1}$ of first ceramic particle is smaller than the particle size $r_{c2}$ of the second ceramic particle, an effect to facilitate grain growth by the second ceramic particle is improved, because the second ceramic particle easily contacts to the first ceramic particle.

Although the embodiment of the present invention has been explained as above, the present invention is not limited to the embodiment at all, and of course it is possible to carry out in various aspects without departing gist of the present invention.

For example, in the above mentioned embodiment, although the multilayer ceramic capacitor was exemplified as an electronic device, as for the electronic device according to the embodiment of the present invention, it is not limited to the multilayer ceramic capacitor and any electronic device are available if a dielectric layer and an internal electrode layer are comprised. Also, as for the first ceramic particle and the second ceramic particle, although dielectric material which satisfies X8R characteristic, X7R characteristic, X5R characteristic of EIA standard are exemplified, it is not particularly limited.

EXAMPLE

Sample 1
(First Ceramic Particle and Second Ceramic Particle)

As a starting material to produce the first ceramic particle and the second ceramic particle, these were blended as composition after firing becomes MgO; 1 mol, $(Ba_{0.6}Ca_{0.4})$ $SiO_3$:3 mol, $V_2O_5$:0.1 mol, $Y_2O_3$:2 mol, MnO:0.374 mol to 100 mol of $BaTiO_3$ of a main composition, wet blending by a ball-mill during 16 hrs was performed, and dried so that raw particles of the first ceramic particle and the second ceramic particle were obtained (herein after referred as "ceramic raw particle").

(Paste for Internal Electrode Layer)

The obtained ceramic raw particles were wet pulverized for 15 hrs by the ball-mill and dried so that the first ceramic particles of 0.1 µm were obtained. Next, 100 parts by weight of Ni particle having an average particle size 0.4 µm, 20 parts by weight of the first ceramic particle, 40 parts by weight of the organic vehicle (8 parts by weight of ethyl cellulose was dissolved to 92 parts by weight of butyl carbitol), and 10 parts by weight of butyl carbitol were kneaded by three roller for pasting so that a paste for internal electrode layer was obtained.

(Paste for Dielectric Layer)

The obtained ceramic raw particles were wet pulverized for 15 hrs by the ball-mill and dried so that the second ceramic particles of 0.25 µm were obtained. Then, these, 4.8 parts by weight of acryl resin, 100 parts by weight of ethyl acetate, 6 parts by weight of mineral spirit, and 4 parts by weight of toluene were blended by the ball-mill for pasting so that a paste for dielectric layer was obtained.

(Paste for External Electrode)

100 parts by weight of Cu particle having an average particle size 0.5 µm, 35 parts by weight of the organic vehicle (8 parts by weight of ethyl cellulose was dissolved to 92 parts by weight of butyl carbitol) and 7 parts by weight of the butyl carbitol were kneaded for pasting so that a paste for external electrode was obtained.

(Process for Producing Multilayer Body)

Sheet forming was performed on a PT film by the doctor blade method with using the obtained paste for dielectric layer, and drying so that a green sheet was formed. At this time, a thickness of the green sheet was set as 3.0 µm. After obtaining the sheet unit by printing the paste for internal electrode layer thereon, the sheet unit was removed from the PET film. Then, a multilayer body was obtained by laminating a plurality of sheet units. A number of laminating of the sheet unit was 200 layers.

Next, after obtaining the green chip by cut out the multilayer body to a predetermined size, binder removal process, firing and annealing were performed so that the capacitor element body was obtained.

The binder removal process was performed under a condition that temperature rising speed 15° C./hr, a holding temperature 280° C., a holding time 2 hrs, in air atmosphere.

The firing was performed under a condition that temperature rising speed 200° C./hr, a holding temperature 1260 to 1340° C., a holding time 2 hrs, cooling speed 300° C./hr, in a wet mixing gas of $N_2+H_2$ atmosphere (oxygen partial pressure $10^{-6}$ Pa).

The annealing was performed under a condition that holding temperature 1200° C., temperature holding time 2 hrs, cooling speed 300° C./hr, in nitrogen atmosphere. Note that, for moisturizing the atmosphere gas at the time of binder removal process and firing, a wetter of a water temperature 35° C. was used.

(Forming External Electrode)

An end face polishing was performed to the element body obtained as above by sandblasting and the like, Cu was coated as an external electrode by forming the external electrodes 6, 8, so that a capacitor sample was obtained.

Size of the obtained capacitor sample was 1.6 mm×0.8 mm×0.8 mm, the number of the dielectric layer sandwiched by the internal electrode was 200, a thickness of the dielectric layer per one layer (interlaminar) was 2 μm, a thickness of the first ceramic layer (t1) was 0.32 μm, a thickness of the second ceramic layer (t2) was 1.68 μm and a thickness of the internal electrode layer was 0.9 μm.

In the example of the present invention, a transverse strength as a mechanical strength of the element body was measured by a method shown as follows, and evaluation of highly accelerated life time of the capacitor sample was performed. Results are shown in Table 1.

(Transverse Strength)

Figure 4:
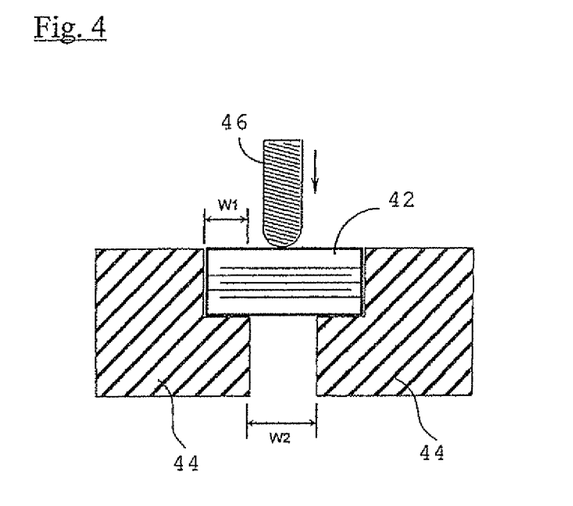
FIG. 4 is an explanatory drawing of a measuring method of a transverse intensity in an embodiment of the present invention.

The transverse strength was measured as follows, in comply with a three point measuring method defined JIS (Japan Industrial Standard)-T1601. At first, a pair of jigs 44, in which a width W1 of gap was provided at a corner, is placed with a space of width W2. Then, as shown in FIG. 4, the element body 42 was placed at the gap portion of the jig 44. Then, the element body 42 was pressed by a loading 46 of a width: 2.0 mm, a curvature radius of bottom face: 0.5 mm with a speed 30 mm/min so that a loading pressure when it was broken was measured. The loading pressure is shown by a unit [N], in the present example, 65N or more was defined as good and 80N or more was defined as a preferable range.

(Highly Accelerated Life Time)

A highly accelerated life time was measured by maintaining direct current of 10V/μm at 160° C. to the capacitor sample. In the present example, a time until a resistance falls by one digit from starting voltage application is defined as "life time", this was performed to 10 numbers of capacitor samples so that an average life time thereof was calculated. In the present example, 20 hrs or more is defined as good.

Samples 2 to 8

Element bodies and capacitor samples were produced as similar with the sample 1, except for changing the $r_{c1}$ and $r_{c2}$, transverse strengths and highly accelerated life time were measured. Results are shown in Table 1.

Samples 11 to 13

Element bodies and capacitor samples were produced as similar with the sample 1, except for changing a content of the first ceramic particle included in the paste for internal electrode layer and a drying temperature were as shown in Table 2, transverse strengths and highly accelerated life time were measured. Results are shown in Table 2.

Samples 21 to 25

Element bodies and capacitor samples were produced as similar with the sample 1, except for changing the $r_{c1}$ of the first ceramic particle included in the past for internal electrode layer and a content of the first ceramic particle are as shown in Table 3, transverse strengths and highly accelerated life time were measured. Results are shown in Table 3.

TABLE 1

|  | particle size of first ceramic particle($r_{01}$) [μm] | particle size of second ceramic particle($r_{01}$) [μm] | t1 [μm] | t2 [μm] | r1 [μm] | r2 [μm] | r1/r2 | t1/(t1 + t2) | transverse strength [N] | highly accelated life time [h] |
|---|---|---|---|---|---|---|---|---|---|---|
| sample 1 | 0.10 | 0.25 | 0.32 | 1.89 | 0.43 | 0.30 | 1.43 | 0.160 | 73 | 32.8 |
| sample 2 | 0.10 | 0.25 | 0 | 2 | — | 0.30 | — | 0 | 32 | 36.9 |
| sample 1 | 0.10 | 0.25 | 0.32 | 1.68 | 0.43 | 0.30 | 1.43 | 0.160 | 73 | 32.8 |
| sample 3 | 0.10 | 0.25 | 0.37 | 1.63 | 0.45 | 0.30 | 1.50 | 0.185 | 79 | 27 |
| sample 4 | 0.10 | 0.25 | 0.42 | 1.58 | 0.50 | 0.30 | 1.67 | 0.210 | 88 | 24.2 |
| sample 5 | 0.10 | 0.25 | 0.55 | 1.45 | 0.65 | 0.30 | 2.17 | 0.275 | 91 | 23.8 |
| sample 6 | 0.10 | 0.25 | 0.85 | 1.35 | 0.70 | 0.30 | 2.33 | 0.325 | 98 | 5.4 |
| sample 7 | 0.10 | 0.25 | 1.70 | 0.30 | 0.35 | 0.20 | 1.75 | 0.850 | 98 | 1.9 |

TABLE 2

|  | particle size of first ceramic particle($r_{01}$) [μm] | content amount of first ceramic particle※ [parts by weight] | drying temperature [temp.] | t1 [μm] | r1 [μm] | t2 [μm] | r2 [μm] | t1/(t1 + t2) | transverse strength [N] | highly accelated life time [h] |
|---|---|---|---|---|---|---|---|---|---|---|
| sample 11 | 0.10 | 15 | 100 | 0 | — | 2.00 | 0.30 | 0 | 32 | 35.9 |
| sample 12 | 0.10 | 15 | 80 | 0.37 | 0.45 | 1.53 | 0.30 | 0.185 | 79 | 27 |
| sample 13 | 0.10 | 15 | 60 | 0.42 | 0.50 | 1.58 | 0.30 | 0.210 | 88 | 24.2 |

※a content of the first ceramic particle included in the internal electrode pattern layer when a content of the conductive particle included in the internal electrode pattern layer is defined as 100 parts by weight.

TABLE 3

|  | particle size of first ceramic particle($r_{01}$) [μm] | content amount of first ceramic particle※ [parts by weight] | drying temperature [temp.] | t1 [μm] | r1 [μm] | t2 [μm] | r2 [μm] | t1/(t1 + t2) | transverse strength [N] | highly accelated life time [h] |
|---|---|---|---|---|---|---|---|---|---|---|
| sample 21 | 0.10 | 5 | 80 | 0 | — | 2.00 | 0.30 | 0 | 29 | 38.8 |
| sample 22 | 0.10 | 10 | 80 | 0.32 | 0.43 | 1.68 | 0.30 | 0.150 | 73 | 32.8 |
| sample 23 | 0.10 | 15 | 80 | 0.37 | 0.45 | 1.63 | 0.30 | 0.185 | 78 | 27 |

TABLE 3-continued

| | particle size of first ceramic particle($r_{01}$) [μm] | content amount of first ceramic particle·X· [parts by weight] | drying temperature [temp.] | t1 [μm] | r1 [μm] | t2 [μm] | r2 [μm] | t1/(t1 + t2) | transverse strength [N] | highly accelated life time [h] |
|---|---|---|---|---|---|---|---|---|---|---|
| sample 24 | 0.10 | 20 | 80 | 0.55 | 0.85 | 1.45 | 0.30 | 0.275 | 91 | 23.8 |
| sample 25 | 0.10 | 25 | 80 | 0.65 | 0.70 | 1.36 | 0.30 | 0.325 | 96 | 5.4 |

·X·a content of the first ceramic particle included in the internal electrode pattern layer when a content of the conductive particle included in the internal electrode pattern layer is defined as 100 parts by weight.

Samples 1 to 7

From samples 1 to 7, it was confirmed that the transverse strength was improved in case that the first dielectric particle is included (samples 1, 3 to 7) compared with the case that the first dielectric particle is not included (Sample 2).

Also, incase that the t1/(t1+t2) is included in a range of 0.160≦t1/(t1+t2)≦0.275 (samples 1, 3 to 5), it was confirmed that the transverse strength and the highly accelerated life time were improved.

Samples 11 to 13

From samples 11 to 13, in case that the drying temperature was 80° C. or below (samples 11, 13), it was confirmed the transverse strength becomes improved compared with a case that the drying temperature exceeds 80° C. (sample 11). It can be considered because the first dielectric particle was not formed, when the drying temperature exceeds 80° C., convective flow occurs in the internal electrode layer patter 130, even though the drying time was provided, the first ceramic particles were not largely distributed unevenly as shown in FIG. 3, but the first ceramic particles were homogeneously-distributed in the internal electrode layer pattern.

Samples 21 to 25

From samples 21 to 25, in case that a content of the first ceramic particle, which is included in the paste for internal electrode layer when the conductive particle included in the paste for electrode layer paste is defined as 100 parts by weight, is included in a range of 10 to 20 parts by weight (samples 22 to 24), it was confirmed that the transverse strength and the highly accelerated life time become better compared with in case that a content of the first ceramic particle is out of said range (samples 21, 25). Thereby, it is considered that, when the first ceramic particle is too few, (sample 21), the first dielectric particle is not formed and thereby, the transverse strength is reduced. Also, when the first ceramic particle is too much (sample 25), a thickness of the first ceramic layer becomes too thicker than a thickness of the second ceramic layer, for this reason, it is considered that the highly accelerated life time is reduced.

The invention claimed is:

1. An electronic device comprised of a plurality of internal electrode layers and dielectric layers alternately laminated wherein
    particle size of first dielectric particles which contact at one laminating direction end face of said internal electrode layer is larger than particle size of second dielectric particles which contact at another laminating direction end face of said internal electrode layers; and
    a thickness of a first ceramic layer formed by said first dielectric particles is smaller than a thickness of a second ceramic layer formed by said second dielectric particles.

2. The electronic device as set forth in claim 1, wherein when the thickness of said first ceramic layer is defined as t1, the thickness of said second ceramic layer is defined as t2, $$0.160 \leq t1/(t1+t2) \leq 0.275.$$

3. The electronic device as set forth in claim 1, wherein when the particle size of said first dielectric particles is r1, the particle size of said second dielectric particles is r2, $$r1/r2 \leq 2.17.$$

4. The electronic device as set forth in claim 1, wherein said first ceramic layer is formed by said first dielectric particles arranged in a plane parallel to a laminating plane, so that said single first dielectric particle exists in a laminating direction per one first ceramic layer.

5. The electronic device as set forth in claim 1, wherein said electronic device is multilayer ceramic capacitor.

6. A method for producing an electronic device comprising steps of;
    preparing a paste for internal electrode layer including first ceramic particles and conductive particles,
    preparing a paste for dielectric layer including second ceramic particles,
    obtaining a green sheet by coating said paste for dielectric layer to a support body,
    obtaining a sheet unit in which an internal electrode pattern layer is formed by said paste for internal electrode layer on said green sheet, and
    obtaining a green chip by laminating said sheet unit, wherein
    a density of said first ceramic particles existing near a face of said internal electrode pattern layer formed on said sheet unit, which does not contact to said green sheet, is larger than a density of said first ceramic particles existing near a face of said internal electrode pattern layer, which contacts to said green sheet.

7. The method for producing the electronic device as set forth in claim 6 further comprising,
    drying said sheet unit at 80° C. or below.

8. The method for producing the electronic device as set forth in claim 6, wherein
    when a content of said conductive particles included in said internal electrode pattern layer is 100 parts by weight, a content of said first ceramic particles included in the internal electrode patter layer is 10 to 20 parts by weight.

9. The method for producing electronic device as set forth in claim 6, wherein
    said electronic device is a multilayer ceramic capacitor.

* * * * *